Sept. 29, 1931.  P. A. HARSEM  1,825,186
HORSESHOE
Filed May 7, 1930
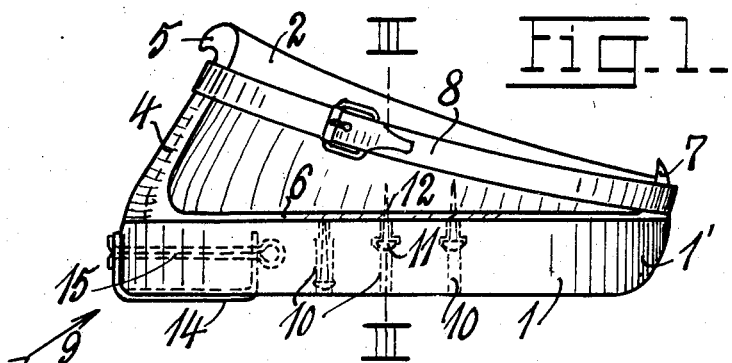
Fig. 1.
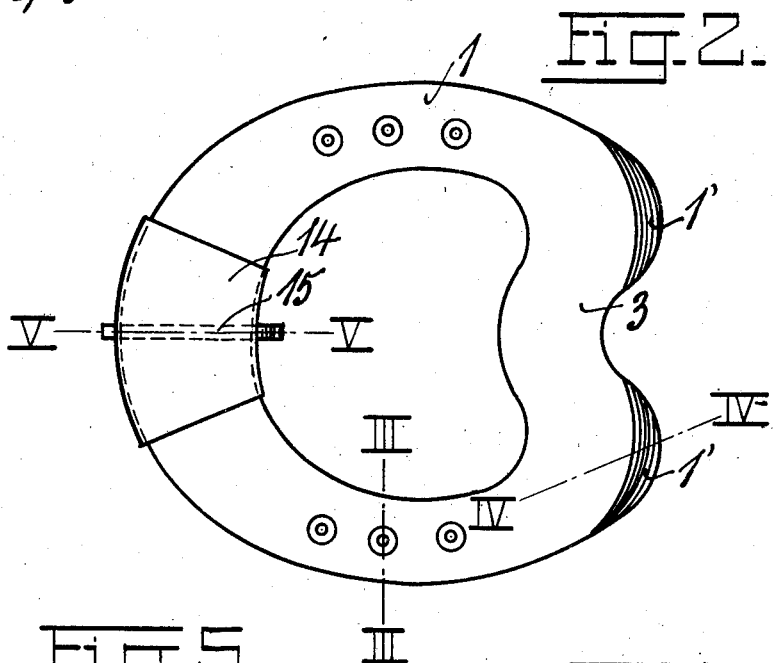
Fig. 2.
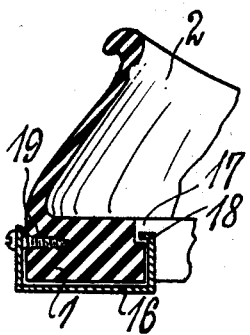
Fig. 5.
Fig. 4.
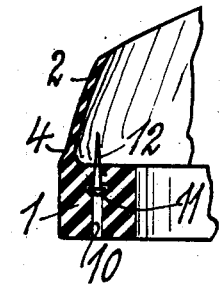
Fig. 3.
P. A. Harsem
INVENTOR
By: Marks & Clerk
Attys.

Patented Sept. 29, 1931

1,825,186

UNITED STATES PATENT OFFICE

PETER ANDREAS HARSEM, OF OSLO, NORWAY, ASSIGNOR TO IMPERATOR HESTESKO A/S., OF TONSBERG, NORWAY, A NORWEGIAN CONCERN

HORSESHOE

Application filed May 7, 1930, Serial No. 450,523, and in Norway November 20, 1929.

The present invention relates to horseshoes of rubber or similar elastic material, along the circumference of which is provided an upstanding flap or toe-cap which covers the hoof of the horse. One of the greatest disadvantages of shoes of this type is that it is very difficult to fasten them to the hoofs of the horse. At the rear part of the horse's hoof the hoof is so thin that it is very difficult to drive in nails or spikes. This work requires a farrier who is particularly skilful, and is difficult even with ordinary iron horseshoes, but is rendered even more difficult when using rubber shoes of the above defined type.

When using horseshoes of iron, this disadvantage is avoided in a simple manner in that no nails are driven in the rear portion of the shoe and the branches of the iron are made sufficiently rigid to require no such direct fastening. If this were done in the case of shoes made from rubber, it would involve the disadvantage that the rear portion of the shoe would readily become loose and flap, if it were not fixed to the hoof in some manner.

A disadvantage which frequently occurs with ordinary rubber horseshoes is that the horse can remove the shoes of the fore feet by striking the hind hoofs against the heel ends of the foreshoes. A further disadvantage of rubber horseshoes occurs particularly with certain horses which knock with the hind hoof. The friction between the front edge of the shoe and the ground will then be so great that the horse may readily be caused to stumble.

The object of the present invention is to provide a shoe of the type above described, in which the disadvantages set forth above are avoided by providing a shoe which affords the great advantage of a rubber horseshoe in respect of its use on hard roads or paving, and which in addition affords the advantage over the customary shoes, whether of rubber or iron, that it can readily be fixed to the hoof of the horse instantaneously by any unskilled person.

According to the present invention the above-mentioned disadvantages are avoided by a series of alterations from previously known rubber horseshoes, which alterations operate alone and in combination to make the shoe of general application and to satisfy all the requirements which can be demanded of a horseshoe.

One important feature of the horseshoe according to the present invention is that the rear portion of the shoe projects upwardly and forms a rigid edge which prevents the hoof from slipping out of the shoe, when the horse is going uphill. This edge can be formed in such manner that it can be used directly or by means of devices attached thereto for securing the tightening devices, such as a strap or the like, the other end of said tightening devices being fixed to the front of the toe-cap. Such tightening devices serve for securing the shoe, and if necessary may be employed in conjunction with other securing devices. In certain cases, however, the straps are secured directly to the shoe itself instead of to the projecting edge.

Other objects of and advantages afforded by the invention will become apparent from the subsequent description, in which various embodiments are described with reference to the accompanying drawings. In the drawings:

Fig. 1 shows a side view of a horseshoe according to the invention;

Fig. 2 is a bottom plan view of the shoe;

Fig. 3 is a fragmentary section taken through the side of the shoe along the lines III—III of Figs. 1 and 2;

Fig. 4 is a section taken along the line IV—IV of Fig. 2, showing the alteration in section at the rear part of the shoe; and Fig. 5 is an alternative construction in section, taken along a line corresponding to the line V—V of Fig. 2, showing the alteration in section toward the front of the shoe.

In the drawings, the horseshoe consists of the shoe proper 1, which is made of hard rubber composition, and which may be constructed as an ordinary shoe with two branches, or may be an annular shoe as shown in the drawings. A toe-cap 2 is formed by an upstanding projecting flap provided along the outer edge of the shoe 1 and tapers upwardly in such manner as to conform precisely to the contour of the hoof. The toe-cap may extend completely around the hoof as shown and merge into the projecting or built-up portion at the rear of the shoe. If an annular shoe is used, the rear ends of the branches of the shoe are connected by means of a bowed member 3 which makes it possible to adjust the breadth of the shoe to suit the hoof of the horse.

The toe-cap 2 is provided at its forward edge with a reinforcement 4 which extends upwardly and tapers and runs into a hook-like portion 5 at the uppermost part of the toe-cap. The reinforcement 4 extends rearwardly along each branch of the shoe in the form of an edge 6 which serves to prevent the hoof of the horse from kicking through the toe-cap 2 at the sides. At the rear end of the hoof the reinforcement 6 merges into a projecting reinforcement or built-up portion 7, so that the toe-cap 2 is secured at the front to the said reinforcement 4 and at the rear to the projecting edge 7.

The shape of the reinforcement 4 and the portion 7 can be altered as desired. The most important purpose of the projecting portion 7 is to provide a support at the rear of the hoof, when the horse is going uphill.

In order to avoid sharp edges, the shoe is rounded off at the back as indicated at 1'. In this manner the risk of a horse knocking shoes from the fore hoofs with the rear hoofs is avoided and this construction also tends to prevent the shoe from becoming loose in any other way.

The projection 7 can be so shaped as to be particularly suitable to form an anchorage for a strap 8 which is passed about the hoof and serves to bind the toe-cap 2 fast thereto. It is obvious that, instead of providing the reinforcement 4 with a hook-like portion 5 and making the built-up portion 7 horn-shaped, an eyelet or ring adapted to secure in position any desired suitable tightening member 8 could be provided on these parts or on the shoe proper.

With securing means of this nature the shoe will remain fixed to the hoof practically without using nails, because the pressure on the shoe is in the direction of the arrow 9 and thus the shoe will not be inclined to become loose. However, it is usually advisable to use a few short nails. The nails need not be much longer than the thickness of the shoe, provided that apertures 10 are provided in the shoe, the lower portion of said apertures having a cross-section which is a little less than the diameter of the head 11 of the nail and the upper portion having a diameter which is somewhat less than the diameter of the nail proper 12. Consequently the shoe is secured in the following manner:

The hoof is first introduced into the toe-cap 2 and the strap 8 tightened. In preparing the shoe, the nails 12 are placed ready in the apertures 10 in such manner that their heads are immediately within the lower surface of the shoe. The nails 12 can be knocked in by any unskilled person by means of a punch or the like, so as to be fixed to the hoof. As the length of the nails is so limited, they will not penetrate through the exterior of the hoof and it is therefore not necessary to bend over the nails. In this manner the shoe is fixed adequately in the course of a remarkably short time. It must be understood that the invention is in no way limited to this securing, inasmuch as there are many horses whose gait necessitates the use of a different mode of fastening.

It has been found that the hoofs of some horses are so shaped at the rear edge and move in such manner when the horse is traveling that the hoof tends to dig into the shoe. In order to avoid this, a metal member 13 can be cast in the rear portion of the shoe as shown in Fig. 4. Preferably this metal member extends upwardly at the rear of the hoof and serves simultaneously as reinforcement of the edge 7. It is to be understood that this characteristic is not necessary for carrying out the invention, but that it is only necessary and preferable in individual cases.

For horses which have the habit of dragging the rear hoofs instead of lifting them, it is further advisable to provide a metal member at the front end of the shoe in order to prevent the horse from stumbling. According to the invention this may consist of a channel-shaped piece of iron 14 of U-section which is fixed to the shoe by means of a pin or bolt 15. Alternatively the iron member can be secured in the shoe itself by means of sharp inturned edges (not shown). If desired, such an iron member may be disposed on the rear connecting member 3 and in a very simple manner provided with nails or sharp calkins for winter use (not shown). In this manner the shoe can be provided with ice nails in an extremely simple manner, as such members can be mounted and removed in a very short time.

Another embodiment of the member 14 is shown at 16 in Fig. 5, in which the rubber portion of the shoe at the top of the inner edge at the front is provided with a recess 17 and the iron member 16 is provided with a corresponding inwardly bent flange 18 so that it can be secured to the shoe in a facile manner by means of a screw 19 on the front of the shoe.

Finally instead of the above-mentioned iron member, metal tags or pins (not shown) may be cast in the shoe in such manner as to project directly from the rubber shoe. In both the last-mentioned cases the shoe may be provided with the customary ice nails.

Claims:—

1. A horseshoe of elastic material, having a toe-cap closely fitting the hoof and a metal member in the upper side of the rear portion of the shoe, so as to prevent the hoof from pressing into the rubber, and having a built-up rear edge serving to prevent the hoof from slipping out at the back of the shoe, said metal member being bent upwardly and adapted to serve for reinforcing the projection at the rear of the shoe.

2. A horseshoe of elastic material, having a toe-cap closely fitting the hoof and a channel-shaped iron member which encloses the front edge of the shoe in such a manner as to prevent the horse from stumbling.

3. A horseshoe of elastic material, having a toe-cap closely fitting the hoof and a channel-shaped iron member which encloses the front edge of the shoe in such a manner as to prevent the horse from stumbling, said member having the same shape as the front end of the shoe and being secured thereto by means catching hold in the body of the shoe proper.

4. A horseshoe of elastic material, having a toe-cap closely fitting the hoof and a channel-shaped iron member which encloses the front edge of the shoe in such a manner as to prevent the horse from stumbling, said member having the same shape as the front end of the shoe and being secured thereto by means catching hold in the body of the shoe proper, said fastening means consisting in an inwardly bent edge on the inside of the channel being received in a corresponding recess on the inside of the front of the shoe, and a screw projecting through the front of the channel iron and into the front side of the front end of the shoe.

In testimony whereof I have signed my name unto this specification.

PETER ANDREAS HARSEM.